April 29, 1924.
F. J. MAHONEY
WALNUT DRIER
Filed May 5, 1922
1,491,996
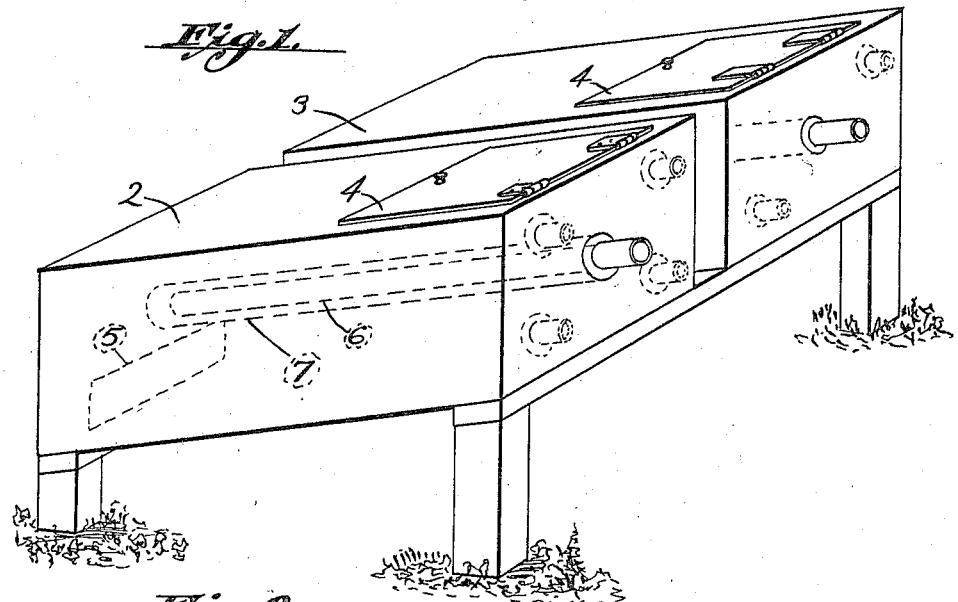
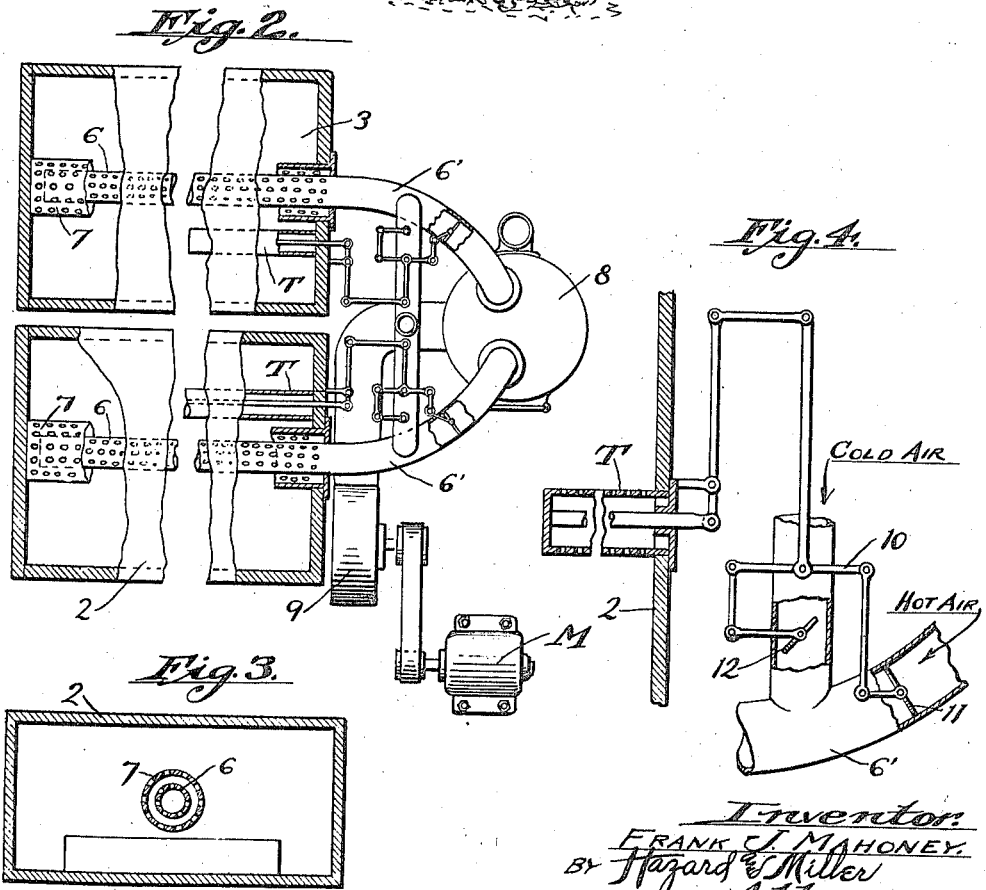

Patented Apr. 29, 1924.

1,491,996

UNITED STATES PATENT OFFICE.

FRANK J. MAHONEY, OF SATICOY, CALIFORNIA.

WALNUT DRIER.

Application filed May 5, 1922. Serial No. 558,598.

*To all whom it may concern:*

Be it known that I, FRANK J. MAHONEY, a citizen of the United States, residing at Saticoy, in the county of Ventura and State of California, have invented new and useful Improvements in Walnut Driers, of which the following is a specification.

This invention relates to drying apparatus, and more especially to apparatus for drying hulled walnuts.

It is an object of the present invention to provide a simple but effective apparatus for the expeditious drying of walnuts. Another object is to provide an apparatus into which the walnuts to be dried may be readily charged and from which they may be easily withdrawn after being dried. Another object is to provide a multiple chamber drying apparatus which may be fed by heated air from one source of supply, and, further, to provide, by multiple chambers, for the loading and unloading of one chamber while another chamber is closed and in operation for drying.

A further object is to provide an automaticaly operative temperature controlling means.

An embodiment of the invention is described in the following specification and illustrated in the accompanying drawings, in which—

Fig. 1 is a perspective of the two unit or double compartment drier, the heating furnace being omitted.

Fig. 2 is a plan showing the organized apparatus including the units and the associated furnace.

Fig. 3 is a cross section through the concentric heating drums.

Fig. 4 is a plan and diagrammatic section of a form of automatic damper regulator.

It is desirable to provide a simple and effective means of suitable capacity for drying orchard products, and more particularly walnuts. When dried in the open air during the harvesting period, the process takes about two weeks. I have provided an apparatus of simple and practical construction, in which batches of walnuts are dried in forty-eight hours in temperatures running from normal atmosphere to one hundred degrees more or less.

Preferably, the apparatus is built in the form of drying chambers or units 2 and 3 arranged in couple so that while one chamber is in process, the adjacent chamber may have its dried charge removed as through a door 5, while immediately thereafter a fresh charge can be entered through a door 4 which may be on the top of the unit.

According to the transverse dimensions of each unit I arrange one or more heating means. I have found that best results are obtained by the arrangement longitudinally in each drying unit of a central hot air flue 6. This flue is perforated or foraminous so that the heated air may pass laterally therethrough. It is desirable to prevent the walnuts from coming directly in contact with the primary heat flue 6 and to that end the flue is surrounded by a jacket 7 which also is foraminous or perforated. This form of heating device provides for the comparatively free passage of the heated air from the flue 6 into the jacket or guard 7 which is in the form of a pipe arranged concentrically about the inner flue 6. From the jacket 7 the heated air may radiate substantially uniformly throughout its length to raise the temperature in the drying unit.

I have found it preferable to construct the unit sections as of boards set vertically and of one by twelve transverse dimensions arranged with their longitudinal edges parallel but not butted tight. This, therefore, enables the gradual escape of the heated air from the interior but acts to retard the air to such a degree that the chamber is maintained substantially at one uniform temperature throughout the mass of nuts or other objects that may be in process of drying.

When the units are arranged in couple, as 2 and 3, the forward ends of the heat flues 6 may be brought around toward each other as at 6' and connected to a heating furnace 8 through which there is driven a current of air as by a blower 9 which is here shown as driven by an electric motor M.

It is desirable that automatic means be provided to maintain the temperature substantially uniform in the drying chambers and this is accomplished by the arrangement of a thermostatic device T in a chamber and connecting to this device a link and lever train 10. One of the links is connected to a hot air damper 11 arranged as one of the branches 6' leading to the heat flue, while another of the links is connected to a damper 12 which is arranged in a cold air pipe 13 leading into its respective branch 6'. It will be seen, therefore, that as the temperature rises above a predetermined degree, the thermostatic mechanism will operate automatically to open the cold air damper 12 and to close the hot air damper 11 controlling flow from the furnace 8. This action will result in a gradual lowering of the temperature in the drier chamber and when the temperature falls below the predetermined degree, then a reverse action occurs and the hot air damper 11 opens concurrently with the closing of the cold air damper.

From the above it will be seen that a given average temperature will be readily maintained.

Preferably, the chambers of the units 2 and 3 are arranged with their tops and bottoms parallel and in an inclined plane as to the horizontal so as to facilitate discharge of the contents from the door 5 which is arranged adjacent the bottom of each unit.

Various modifications and changes may be resorted to within the spirit of the invention as claimed.

What is claimed is:

In a drying apparatus, a drying chamber, a heating device extending into the chamber, a source of heat supply including an air heating furnace having a branch connected to the heating device, and automatic temperature controlled means for regulating the temperature obtaining in the chamber by controlling flow from the heating source.

In testimony whereof I have signed my name to this specification.

FRANK J. MAHONEY.